(12) United States Patent
Song

(10) Patent No.: US 9,069,493 B2
(45) Date of Patent: Jun. 30, 2015

(54) IMAGE FORMING APPARATUS

(71) Applicant: Samsung Electronics Co., Ltd, Suwon-si, Gyeonggi-do (KR)

(72) Inventor: Young Hwa Song, Inchon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 6 days.

(21) Appl. No.: 13/718,231

(22) Filed: Dec. 18, 2012

(65) Prior Publication Data

US 2013/0155431 A1 Jun. 20, 2013

(30) Foreign Application Priority Data

Dec. 20, 2011 (KR) ........................ 10-2011-0138625

(51) Int. Cl.
*G06F 3/12* (2006.01)
*G06K 15/00* (2006.01)
*G03G 21/18* (2006.01)

(52) U.S. Cl.
CPC .................................... *G06F 3/1201* (2013.01)

(58) Field of Classification Search
USPC .......... 358/1.9, 1.14; 713/310, 320, 324, 323; 399/37, 88, 16, 17, 365, 113
See application file for complete search history.

(56) References Cited

U.S. PATENT DOCUMENTS 8,225,117 B2 * 7/2012 Hanada et al. ................ 713/310

FOREIGN PATENT DOCUMENTS

| DE | 19602666 | 8/1996 |
| JP | 2011-101330 | 5/2011 |
| JP | 2011-191566 | 9/2011 |

OTHER PUBLICATIONS

European Search Report issued in Application No. 12197718.5 on Oct. 17, 2013.
U.S. Office Action dated May 8, 2015 from U.S. Appl. No. 14/519,867.
U.S. Appl. No. 14/519,867, filed Oct. 21, 2014, Young Hwa Song, Samsung Electronics Co., Ltd.

* cited by examiner

*Primary Examiner* — Charlotte M Baker
(74) *Attorney, Agent, or Firm* — Staas & Halsey LLP

(57) ABSTRACT

An image forming apparatus to effectively reduce power consumption of an image forming apparatus in a sleep mode by reducing current consumed in an operating panel microcomputer by operating parts by constituting the parts so that a power voltage is continually supplied to the parts to indicate that the image forming apparatus is in a power-on state while stopping the operation of the operating panel microcomputer of an operating panel part in a sleep mode.

15 Claims, 7 Drawing Sheets

IMAGE FORMING APPARATUS

CROSS-REFERENCE TO RELATED APPLICATIONS

This application claims the benefit of Korean Patent Application No. 2011-0138625, filed on Dec. 20, 2011 in the Korean Intellectual Property Office, the disclosure of which is incorporated herein by reference in its entirety.

BACKGROUND OF THE INVENTION

1. Field of the Invention

Embodiments of the present inventive concept relate to an image forming apparatus which can effectively reduce power consumption.

2. Description of the Related Art

An image forming apparatus, for example, a multi-function printer (MFP) may be broadly divided into two parts, namely, an operating panel part which accepts a user input, and a main control part which controls operations of the MFP such as actual copying, scanning and printing tasks. The user input is received in the operating panel part, and the main control part is requested to perform a task. Thereafter, the operating panel part receives the result of the task and displays the result.

In the past, the operating panel part and the main control part of an image forming apparatus were composed of one CPI and one board, but in order to provide better speed and user experience (UX), the operating panel part has recently been composed of one operating panel microcomputer and one board, and the main control part is composed of one CPU and one board.

Recently, as concern for the environment rapidly increases, many products support a sleep mode, which may be compared to a normal mode, in which unnecessary power consumption may be reduced when the user does not use the product.

According to the conventional art, when the user does not use a multi-function printer, a sleep mode is turned on, and thus power of main components is turned off, thereby effectively reducing power consumption.

However, at the sleep mode, in order to continually operate parts for allowing the consumer to distinguish the sleep mode from the power-off mode, such as a power LED, etc. which show that the product is in a power-on state, the control panel microcomputer of the control panel part should maintain power-on state even in the sleep mode.

As such, even in the sleep mode, power for maintaining the power-on state of the control panel microcomputer is continually consumed.

SUMMARY OF THE INVENTION

It is an aspect of the present inventive concept to provide an image forming apparatus that allows a power voltage to be supplied to parts to allow a consumer to distinguish a sleep mode from a power-off mode while stopping an operation of an OPE microcomputer of an operating panel part in a sleep mode so as to reduce power consumption of the image forming apparatus in the sleep mode.

Additional features and utilities of the present general inventive concept will be set forth in part in the description which follows and, in part, will be obvious from the description, or may be learned by practice of the general inventive concept.

Exemplary embodiments of the present inventive concept provide an image forming apparatus having an operating panel part to display a screen for input of a command from a user and to receive the command from the user, the image forming apparatus includes a central processing unit (CPU) to control an operation of the image forming apparatus, and an operating panel microcomputer provided in the operating panel part, the microcomputer receiving a reset signal input from the CPU, wherein the CPU changes a voltage level of the reset signal input to the operating panel microcomputer to stop an operation of the operating panel microcomputer in a sleep mode.

The operating panel part may include an element to indicate that the image forming apparatus is powered on, and a switching unit to turn on or off to supply an operating voltage to the element, wherein the switching unit is turned off by a switching signal, the switching signal being output when the operation of the operating panel microcomputer is stopped.

The switching unit may include a pull-down resistor unit connected to a ground terminal, and a PNP-type transistor having a base connected to the pull-down resistor, a collector connected to one side of the element, and an emitter connected to the operating voltage.

The element is a power light-emitting diode (LED).

The operating panel part may include a display unit to display the screen for the input of the command from the user, and a switching unit to turn on or off to supply an operating voltage to the display unit and the operating panel microcomputer, wherein the switching unit is turned off by the reset signal, the reset signal being input to the operating panel microcomputer such that the CPU stops the operation of the operating panel microcomputer in the sleep mode.

The operating panel part may include a display unit to display a screen to receive a command from the user, a first switching unit to turn on or off to supply an operating voltage to the display unit, and a second switching unit to turn on or off to supply the operating voltage to the operating panel microcomputer, wherein the first switching unit and the second switching unit are turned off by the reset signal, the reset signal being input to the operating panel microcomputer such that the CPU stops the operation of the operating panel microcomputer in the sleep mode.

Exemplary embodiments of the general inventive concept also provide an image forming apparatus having an operating panel part to display a screen for input of a command from a user and receives the command from the user, the image forming apparatus may include a central processing unit (CPU) to control an operation of the image forming apparatus, an operating panel microcomputer provided in the operating panel part, the microcomputer receiving a reset signal from the CPU, a display unit to display a screen to receive a command from the user, and a first switching unit turned on or off to supply an operating voltage to the display unit and the operating panel microcomputer, wherein the CPU changes a voltage level of the reset signal, the reset signal being input in the operating panel microcomputer to stop an operation of the operating panel microcomputer in a sleep mode, and wherein the first switching unit is turned off by the reset signal of the changed voltage level.

The operating panel part may include an element to indicate that the image forming apparatus is powered on, and a second switching unit to turn on or off to supply an operating voltage to the element, wherein the second switching unit is turned off by a switching signal, the switching signal being output when the operation of the operating panel microcomputer is stopped.

The second switching unit includes a pull-down resistor connected to a ground terminal, and a PNP-type transistor having a base connected to the pull-down resistor, a collector connected to one side of the element, and an emitter connected to the operating voltage.

The element is a power light-emitting diode (LED).

According to the inventive concept, power consumption of the image forming apparatus may be effectively reduced by reducing current consumed in an operating panel microcomputer by stopping the operation of the operating panel microcomputer while operating parts to indicate that the image forming apparatus is in a power-on state in the operating panel part in a sleep mode.

Exemplary embodiments of the general inventive concept also provide a power control circuit to control power supply to an operating panel part of an image forming apparatus, the power control circuit comprising: an input unit to receive an input of various sets of information to execute tasks of the image forming apparatus and to transmit information to an operating panel (OPE) microcomputer of the operating panel part; a first switching unit to be turned on and off by a switching signal of the OPE microcomputer; and a power LED to indicate that power of the image forming apparatus is at a power-on state to distinguish between a sleep mode and a power-off mode, wherein a VCC power is supplied to the power LED when the first switching unit is at a power-on state and the VCC power supply to the power LED is blocked when the first switching unit is at a power-off state.

In an exemplary embodiment, the first switching unit is turned on when the OPE microcomputer is not operated.

In an exemplary embodiment, the power control circuit further comprises: a second switching unit to be turned on when the voltage level of a reset signal received from a main CPU of the image forming apparatus is high and to be turned off when the voltage level of the reset signal is low; and an LCD to display an operation state of the image forming apparatus, the LCD to be controlled by a control signal of the OPE microcomputer, wherein when the second switching unit is turned on, the VCC is supplied to the OPE microcomputer, the input unit and the LCD, and wherein when the second switching unit is turned off, the VCC being supplied to the OPE microcomputer, the input unit and the LCD is blocked.

In an exemplary embodiment, the OPE microcomputer determines whether the operation mode of the image forming apparatus is a normal mode or a sleep mode according to the information input through the input unit.

In another exemplary embodiment, the power control circuit further comprises: a second switching unit to be turned on when the voltage level of a reset signal received from a main CPU of the image forming apparatus is high and to be turned off when the voltage level of the reset signal is low; a third switching unit to be turned on when the voltage level of a reset signal received from a main CPU of the image forming apparatus is high and to be turned off when the voltage level of the reset signal is low; and an LCD to display an operation state of the image forming apparatus, the LCD to be controlled by a control signal of the OPE microcomputer, wherein when the second switching unit is turned on, the VCC is supplied to the LCD and when the second switching unit is turned off, the VCC supplied to the LCD is blocked, and wherein when the third switching unit is turned on a branching operating voltage branched from the VCC is supplied to the OPE microcomputer and the input unit, and if the third switching unit is turned off, the branching operating voltage branched from the VCC and being supplied to the OPE microcomputer and the input unit is blocked.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
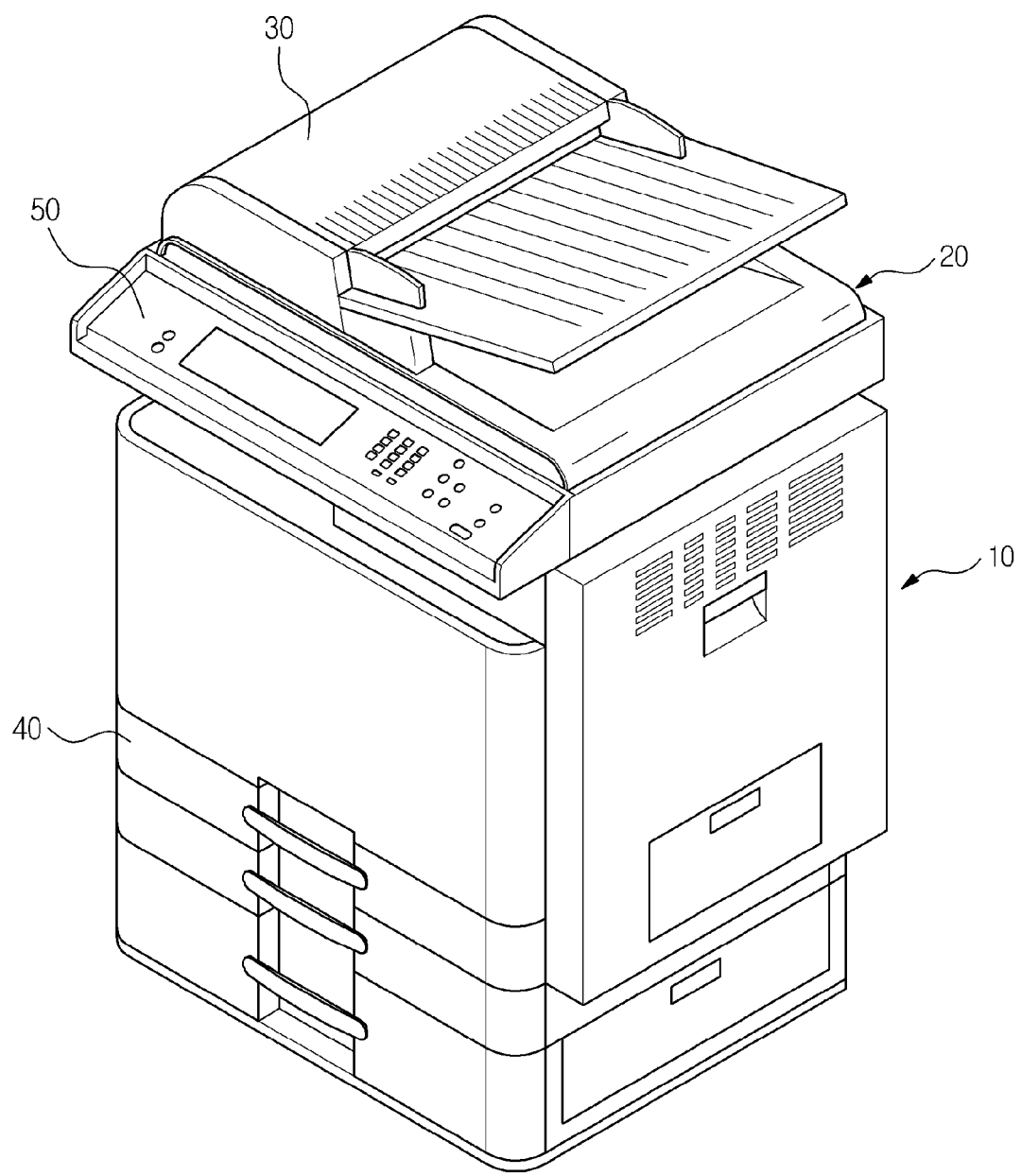
FIG. 1 is an oblique diagram illustrating an image forming apparatus according to an exemplary embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is an example of an image forming apparatus according to the present inventive concept, and illustrates a multi-function printer having copying, scanning and printing functions.

As illustrated in FIG. 1, an image forming apparatus includes a main body 10, a scanning unit 20, an auto document feeder (ADF) 30, a paper feeding cassette 40, and an operating panel 100.

Various components for image formation such as a paper feeding unit, a laser scanning unit, a developing unit, a transfer unit, a fusing unit, a paper exhaust unit, and a sensor unit, etc. are installed in the main body 10.

The scanning unit 20 is disposed on the upper portion, and scans a document. The scanning unit 20 copies or scans a document according to a copy command or a scan command.

The auto document feeder (ADF) 30 feeds papers by automatically releasing each sheet from accumulated sheets of paper.

The paper feeding cassette 40 is disposed on the lower portion of the main body 10, and accepts multiple sheets of paper.

The operating panel 50, as an interface with a user, displays a screen so that the user may select a desired task and give a command to perform the task, and receives a task command such as printing, copying, scanning, etc. from the user.

The operating panel 50 displays a user interface screen, and has a touch panel function in which buttons formed within the user interface screen are operated by a user's finger, etc. The user may operate a button corresponding to a function such as printing, copying, scanning, etc., which is displayed in the user interface screen, to select a desired task.

Hence, if the user inputs a copying, scanning or printing command through the operating panel 100, a document, which is placed on the plate of the scanning unit 20, is copied or scanned, or to-be-printed data is printed on sheets stored in the paper feeding cassette 40.

Figure 2:
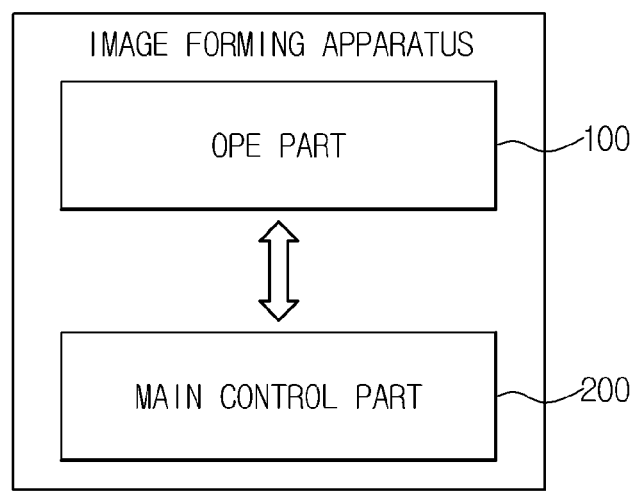
FIG. 2 is a diagram illustrating a relation between an operating panel part and a main control part of an image forming apparatus according to an exemplary embodiment of the present inventive concept.
Figure 3:
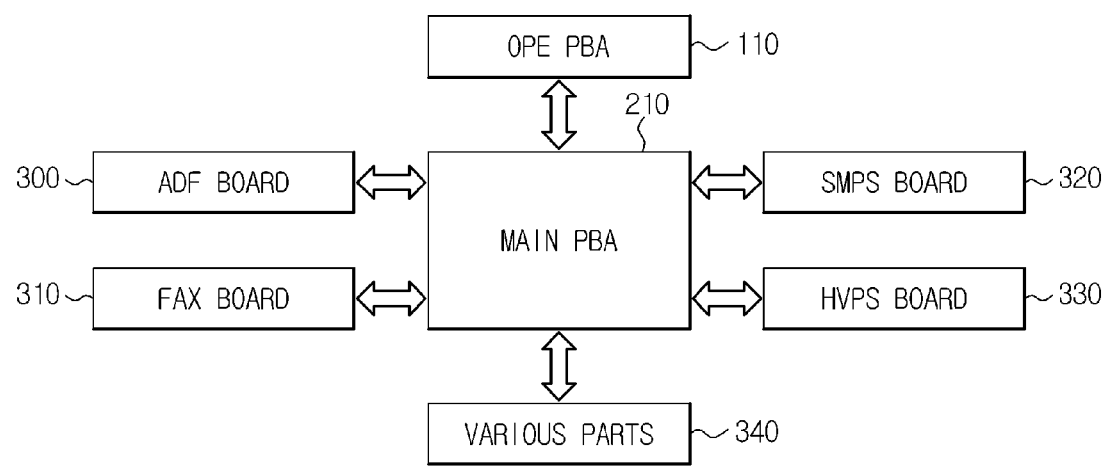
FIG. 3 is a block diagram illustrating a relation between each printed circuit board assembly (PBA), which constitutes the operation panel part and the main control part of the image forming apparatus, and other boards.

FIG. 2 is a diagram illustrating a relation between an operating panel part and a main control part of an image forming apparatus according to an exemplary embodiment of the present inventive concept. FIG. 3 is a block diagram illustrating a relation between each printed circuit board assembly (PBA), which constitutes the operation panel part and the main control part of the image forming apparatus, and other boards.

As illustrated in FIG. 2, an image forming apparatus includes an operating panel part 100 and a main control part 200.

The operating panel part 100 displays a screen to accept a user's selection of a task, and receives an input of a task command from the user.

The main control part 200 controls actual operations of an image forming apparatus such as printing, scanning and printing, and other functions known to those skilled in the art to be performed by an image forming apparatus.

If the image forming apparatus is turned on, the operating panel part 100 is configured to be booted earlier than the main control part 200 so that the user may promptly input information.

The operating panel part 100 and the main control part 200 include a printed circuit board assembly (PBA) composed of one CPU and one board.

As illustrated in FIG. 3, the operating panel part 100 includes an operating panel printed circuit board assembly (hereinafter, referred to as "operating panel equipment (OPE) PBA") 100, and the main control part 200 includes a main printed circuit board assembly (hereinafter, referred to as "main PBA") 210.

The OPE PBA 110 and the main PBA 210 are connected to each other so that communications therebetween are performed.

Various parts 340 such as an ADF board 300, a fax board 310, a switching mode power supply (SMPS) board 320, a high voltage power supply (HVPS) board 330, and various motors, sensors, fans, etc. are connected to the main PBA 210 to which the OPE PBA 110 is connected so that mutual communication is possible.

The ADF board 300 automatically supplies a document when copying or scanning the document.

The fax board 310 communicates with another MFP or fax device.

The SMPS board 320 supplies +5V and +24V to the main PBA 201 and other boards from 110V/220V power voltage input.

The HVPS board 330 supplies high voltage to various devices, which require high voltage in the image forming apparatus, such as a photosensitive medium, a charging unit, a developing unit, a transfer unit, etc.

The main PBA 210 examines the state of all boards 300, 310, 320 and 330 and various parts 340, which are connected to the main PBA 210 except the OPE PBA 110, to complete booting when operation of all the boards and parts is prepared.

Figure 4:
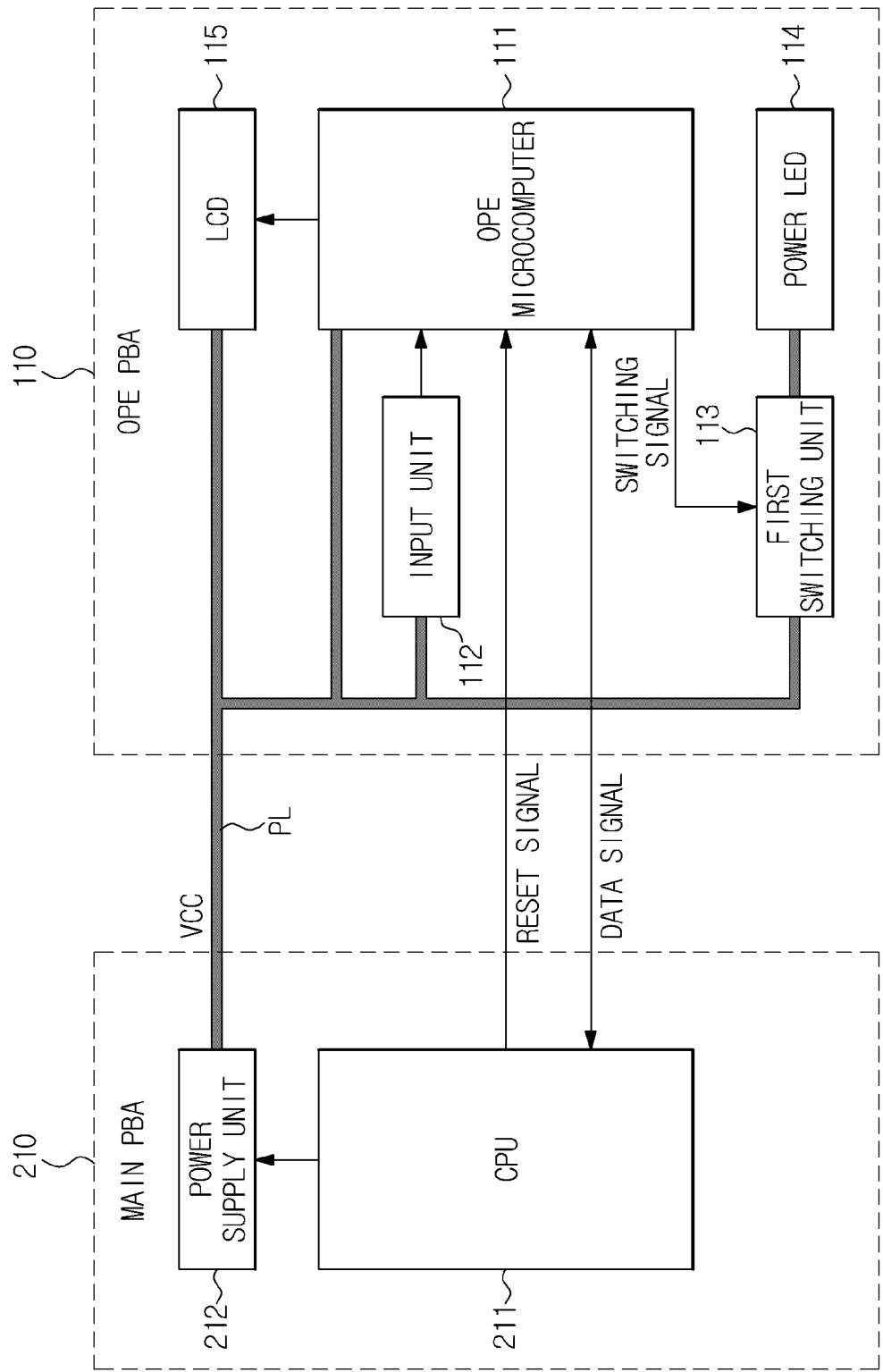
FIG. 4 is a diagram illustrating power supply and signal transmission of a main PBA and an OPE PBA of an image forming apparatus according to an exemplary embodiment of the present inventive concept.

FIG. 4 is a diagram illustrating power supply and signal transmission of a main PBA and an OPE PBA of an image forming apparatus according to an exemplary embodiment of the present inventive concept.

As illustrated in FIG. 4, the main PBA 210 controls actual operations of an image forming apparatus.

The main PBA 210 includes a CPU 211 and a power supply unit 212.

The CPU 211 controls overall operations of the image forming apparatus.

The power supply unit 212 supplies a preset voltage to the OPE PBA 110 according to a control signal of the CPU 211.

The power supply unit 212 outputs, for example, 24V or 5V.

The power supply unit 212 is connected with an OPE microcomputer 111, an input unit 112, a first switching unit 113 and a liquid crystal display (LCD), which is a display unit, of the OPE PBA 110 through a power line (PL), and supplies preset voltage to each component.

The OPE PBA 110 communicates with the main PBA 210 by exchanging information with the main PBA 210. Further, the OPE PBA 110 includes a key which allows setting and change, etc. of various operation modes of the image forming apparatus, and transmits various key data, which is generated by the user in the image forming apparatus, to the main PBA 210.

The OPE PBA 110 includes an OPE microcomputer 111, an input unit 112, a first switching unit 113, a power LED 114 and an LCD 115.

The input unit 112 receives an input of various sets of information to execute a task such as setting and change, etc. of various operation modes from the user. The input unit 112 transmits information, which is input by the user, to the OPE microcomputer 111.

The first switching unit 113 is turned on or off by a switching signal of the OPE microcomputer 111.

The power LED 114 is a part indicating that the power of the image forming apparatus is at a power-on state so that the user may distinguish the sleep mode from the power-off mode, and is connected with the first switching unit 113 through the power line (PL).

VCC power is supplied to the power LED 114 when the first switching unit 113 is at the power-on state. Further, VCC power supply to the power LED 114 is blocked when the first switching unit 113 is at the power-off state.

The LCD 115 is a device to display the operation state of the image forming apparatus. The LCD 115 is controlled by a control signal of the OPE microcomputer 111.

The OPE microcomputer 111 determines whether the operation mode of the image forming apparatus is a normal mode or a sleep mode according to information input through the input unit 112. The OPE microcomputer 111 transmits the determined operation mode information of the image forming apparatus to the CPU 211 of the main PBA 210. Further, the OPE microcomputer 111 may determine that the operation mode is a normal mode if time counted by a timer is less than a preset time, and the operation mode is a sleep mode if time counted by the timer is greater than a preset time.

The CPU 211 controls whether to operate the OPE microcomputer 111 by changing the voltage level of a reset signal, which is output to the OPE microcomputer 111, according to whether the operation mode of the image forming apparatus is a normal mode or a sleep mode. The OPE microcomputer 111 is initialized to the voltage level of this reset signal, or performs normal operation.

If the operation mode of the image forming apparatus is a normal mode, the CPU 211 outputs a reset signal of a high level in the OPE microcomputer 111. The OPE microcomputer 111 becomes operable by this reset signal of a high level.

Further, if the operation mode of the image forming apparatus is a sleep mode, the CPU 211 outputs the reset signal having a low level in the OPE microcomputer 111. The OPE microcomputer 111 is turned off by this reset signal of the low level, thereby becoming inoperable.

That is, the state of the ports of the OPE microcomputer 111 become a high impedance state by a reset signal of this low level, thereby falling into an inoperable state. As such, the input unit 112, the first switching unit 113 and the LCD 115, which are connected to these ports, cannot be controlled. Hence, the OPE microcomputer 111 rarely consumes electric current, and thus power consumption of the image forming apparatus may be effectively reduced.

As stated above, since the power LED 114 needs to maintain the operation state even if the OPE microcomputer 111 is turned off, in the case in which the port, which outputs a switching signal of the OPE microcomputer 111, is at a high impedance state, the first switching unit 113 is configured so that the first switching unit 113 may be turned on.

Figure 5:
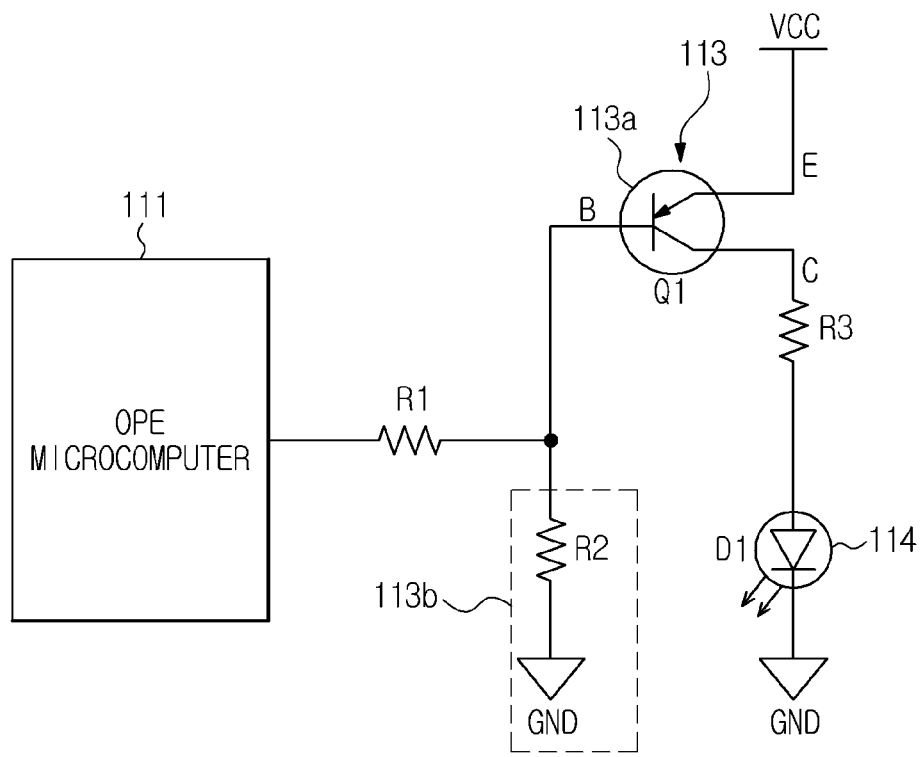
FIG. 5 is a drawing illustrating operating a power LED when the OPE microcomputer of FIG. 4 is not operated.

FIG. 5 is a drawing illustrating operating a power LED when the OPE microcomputer 111 of FIG. 4 is not operated, and describes a principle of turning on the power LED when the OPE microcomputer is not operated.

As illustrated in FIG. 5, the first switching unit 113 includes a PNP-type transistor (Q1) 113*a* and a pull-down resistor unit 113*b*.

The PNP type transistor (Q1) is a combination of semiconductors in which the n-type region is placed between two p-type regions which have a low impurity concentration and are narrow, and includes a base (B), which is a central region, an emitter (E), which is a forward region located outside from this base (B), and a collector (C), which is a backward region.

The base C of the PNP-type transistor (Q1) 113*a* is connected via a resistor R1 and a port which outputs a switching signal to switch the first switching unit 113. Further, the emitter E is connected to the operating voltage VCC, and the collector C is connected to the ground terminal (GND) via the power LED 114 and the resistor R3 connected in series.

The pull-down resistor unit 113*b* is connected to the ground terminal (GND) and the base (C) of the PNP-type transistor (Q1) 113*a*, and includes a resistor R1 connected to a port, which outputs a switching signal in the OPE microcomputer 111, and a pull-down resistor R2 connected in parallel.

When the OPE microcomputer 111 is not operated (a reset signal is at a low level) by using the pull-down resistor R2, the power LED is turned on by turning on the PNP type transistor Q1. That is, the user may recognize the sleep mode.

For reference, in the case in which an error such as "no developing cartridge" and "jam" occurs, the OPE microcomputer 111 may be configured to turn on an error LED instead of turning on the power LED 114 when entering the sleep mode.

Likewise, in the sleep mode, the CPU 211 lowers the voltage level of a reset signal, which is output to the OPE microcomputer 111, to a low level. The OPE microcomputer 111 may reduce the power consumed in the OPE microcomputer 111 as the state of ports become a high impedance state by a reset signal of the low level and the operation stops. At this time, even if the state of the ports of the OPE microcomputer 111 become a high impedance state, the pull-down resistor unit 113*b* is applied to the base B of the PNP type transistor (Q1) 113*a* so that the power LED 114 may be turned on.

Figure 6:
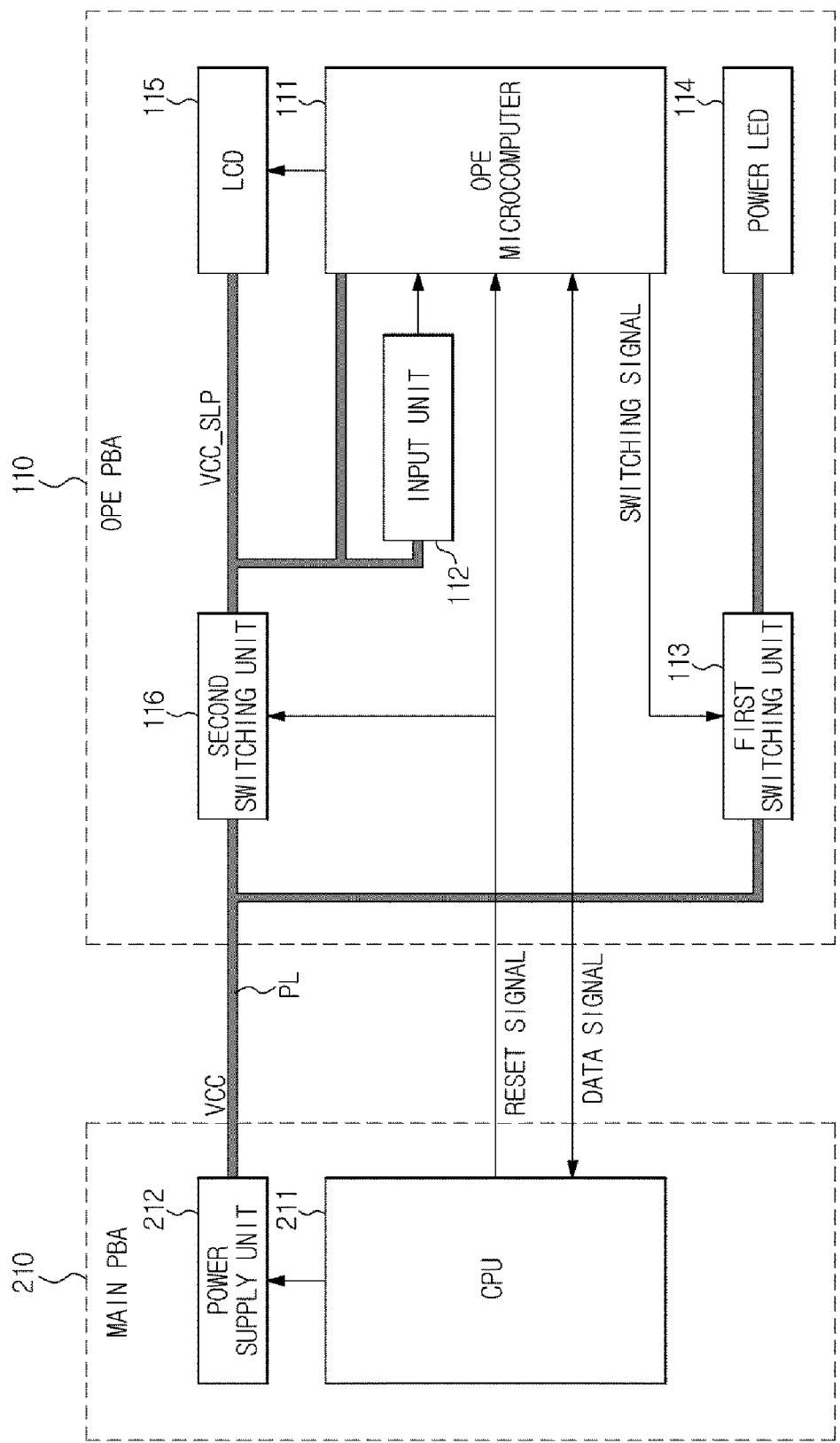
FIG. 6 is a drawing illustrating power supply and signal transmission of a main PBA and an OPE PBA in an image forming apparatus according to another exemplary embodiment of the present inventive concept.

FIG. 6 is a drawing illustrating power supply and signal transmission of a main PBA and an OPE PBA in an image forming apparatus according to another exemplary embodiment of the present inventive concept.

As illustrated in FIG. 6, the OPE PBA 110 includes an OPE microcomputer 111, an input unit 112, a first switching unit 113, a power LED 114, an LCD 115, and a second switching unit 116.

The input unit 112 receives an input of various sets of information to execute a task such as setting and change, etc. of various operation modes from a user. The input unit 112 transmits information, which is input from the user, to the OPE microcomputer 111.

The first switching unit 113 is turned on or off by the switching signal of the OPE microcomputer 111.

The power LED 114 is a part showing that the power of the image forming apparatus is at a power-on state so that the user may distinguish the sleep mode from the power-off mode, and is connected with the first switching unit 113 through the power line (PL).

VCC power is supplied to the power LED 114 when the first switching unit 113 is at the power-on state. Further, VCC power supply to the power LED 114 is blocked when the first switching unit 113 is at the power-off state.

The LCD 115 is a device for displaying the operation state of the image forming apparatus. The LCD 115 is controlled by a control signal of the OPE microcomputer 111.

The second switching unit 116 is turned on in the case in which the voltage level of a reset signal, which is output from the CPU 211 to the OPE microcomputer 111, is high, and is turned off in the case in which the voltage level of the reset signal is low.

If the second switching unit 116 is turned on, operating voltage VCC is supplied to the OPE microcomputer 111, the input unit 112 and the LCD 115. Further, if the second switching unit 116 is turned off, the operating voltage VCC, which is supplied to the OPE microcomputer 111, the input unit 112 and the LCD 115, is blocked.

The CPU 211 controls whether to operate the OPE microcomputer 111 by changing the voltage level of a reset signal, which is output to the OPE microcomputer 111 according to whether the operation mode of the image forming apparatus is a normal mode or a sleep mode.

If the operation mode of the image forming apparatus is a normal mode, the CPU 211 outputs a reset signal of a high level in the OPE microcomputer 111. The state of the OPE microcomputer 111 becomes operable state and the second switching unit 116 is turned on by this reset signal of a high level.

Further, if the operation mode of the image forming apparatus is a sleep mode, the CPU 211 outputs the reset signal of a low level in the OPE microcomputer 111. The state of the OPE microcomputer 111 becomes inoperable and the second switching unit 116 is turned off by this reset signal of the low level. As the second switching unit 116 is turned off, branch operating voltage (VCC_SLP), which is supplied to the OPE microcomputer 111, the input unit 112 and the LCD 115, is blocked.

Here, parts (e.g., a power LED or an inverter), which should be turned on in a sleep mode, are designed to use operating voltage VCC at the front end of the second switching unit 116, and parts (e.g., an OPE microcomputer, an input unit and an LCD), which should be turned off in a sleep mode, are designed to use branch operating voltage after the second switching unit 116.

As such, as the second switching unit 116 is turned off by the reset signal of a low level at a sleep mode, the branch operating voltage, which is supplied to the OPE microcomputer 111, the input unit 112 and the LCD 115, may be blocked, and thus the power consumption, which is used in the OPE microcomputer 111, the input unit 112 and the LCD 115, may be saved.

Likewise, FIG. 6 illustrates a method of reducing power consumption using a voltage level of a reset signal which is output from the CPU 211 to the OPE microcomputer 111 as in FIG. 5. When entering the sleep mode, the reset signal is changed to a low level, and the second switching unit 116 is turned on or off by this signal depending on the mode.

If the branch operating voltage (VCC_SLP) is blocked, the OPE microcomputer 111 and the LCD 115, etc., which use this voltage, are not operated, and thus the power consumption may be effectively reduced. Here, the power LED 114 is turned on using the pull-down resistor R2 as in FIG. 5, and when an error occurs, the voltage level of the reset signal is maintained at a high level so that the OPE microcomputer 111 may control the LED.

Figure 7:
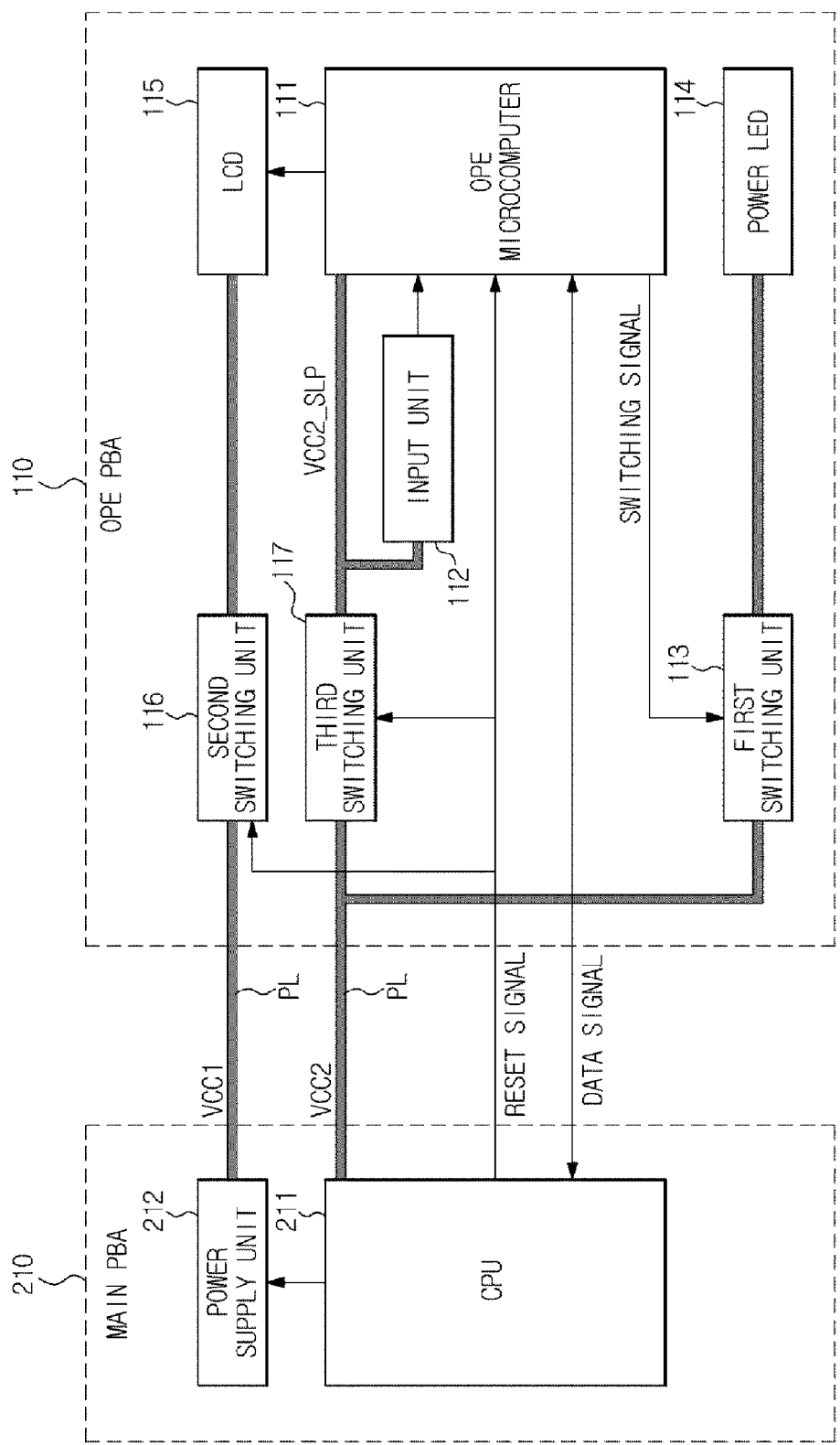
FIG. 7 is a drawing illustrating power supply and signal transmission of a main PBA and an OPE PBA in an image forming apparatus according to yet another exemplary embodiment of the present inventive concept.

FIG. 7 is a drawing illustrating power supply and signal transmission of a main PBA and an OPE PBA in an image forming apparatus according to yet another exemplary embodiment of the present inventive concept.

As illustrated in FIG. 7, the OPE PBA 110 includes a second switching unit 116 and a third switching unit 117.

The second switching unit 116 is turned on in the case in which the voltage level of the reset signal, which is output from the CPU 211 to the OPE microcomputer 111, is high, and is turned off in the case in which the voltage level of the reset signal is low.

If the second switching unit 116 is turned on, the operating voltage VCC1 is supplied to the LCD 115. Further, if the second switching unit 116 is turned off, the operating voltage VCC1, which is supplied to the LCD 115, is blocked.

The third switching unit 117 is turned on in the case in which the voltage level of the reset signal, which is output from the CPU 211 to the OPE microcomputer 111, is high, and is turned off in the case in which the voltage level of the reset signal is low.

If the third switching unit 117 is turned on, the branch operating voltage (VCC2_SLP) is supplied to the OPE microcomputer 111 and the input unit 112. Further, if the third switching unit 117 is turned off, the branch operating voltage (VCC_SLP), which is supplied to the OPE microcomputer 111 and the input unit 112, is blocked.

The CPU 211 controls operation of the OPE microcomputer 111 by changing the voltage level of the reset signal which is output to the OPE microcomputer 111 according to whether the operation mode of the image forming apparatus is a normal mode or a sleep mode.

If the operation mode of the image forming apparatus is a normal mode, the CPU 211 outputs a reset signal of a high level to the OPE microcomputer 111. By this reset signal of a high level, the OPE microcomputer 111 becomes operable, and the second switching unit 116 and the third switching unit 117 are turned on.

Further, if the operation mode of the image forming apparatus is a sleep mode, the CPU 211 outputs a reset signal of a low level to the OPE microcomputer 111. By this reset signal of a low level, the operation of the OPE microcomputer 111 is disabled, and the second switching unit 116 and the third switching unit 117 are turned off. As the second switching unit 116 and the third switching unit 117 are turned off, the operating voltage VCC1, which is supplied to the LCD 115, is blocked, and the branch operating voltage VCC2_SLP, which is supplied to the input unit 112 and the OPE microcomputer 111, is blocked.

Likewise, in the OPE PBA 110 which uses multiple power sources, power consumption is reduced using multiple switching units 116 and 117 which are turned on or off by a voltage level of a reset signal which is output from the CPU 211 to the OPE microcomputer 111 at a sleep mode.

FIG. 7 is a use example when there are multiple VCC power sources in FIG. 6. That is, in the OPE PBA 110 which uses multiple power sources, a reset signal is changed to a low level at a sleep mode as in FIG. 6, and as the multiple switching units 116 and 117 are turned off by this signal, the OPE microcomputer 111, the input unit 112, and the LCD 115 are not operated, thereby reducing power consumption.

Here, the power LED 114 is turned on using the pull-down resistor R2 as in FIG. 5, and when an error occurs, the reset signal is maintained at a high level so that the OPE microcomputer 111 may control the LED 114.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus having an operating panel part to display a screen for input of a command from a user and to receive the command from the user, the image forming apparatus comprising:
    a central processing unit (CPU) to control an operation of the image forming apparatus; and
    an operating panel microcomputer provided in the operating panel part, the microcomputer receiving a reset signal input from the CPU,
    wherein the CPU changes a voltage level of the reset signal input to the operating panel microcomputer to stop an operation of the operating panel microcomputer in a sleep mode.

2. The image forming apparatus according to claim 1, wherein the operating panel part includes an element to indicate that the image forming apparatus is powered on, and a switching unit to be turned on or off to supply an operating voltage to the element,
    wherein the switching unit is turned off by a switching signal, the switching signal being output when the operation of the operating panel microcomputer is stopped.

3. The image forming apparatus according to claim 2, wherein the switching unit includes a pull-down resistor unit connected to a ground terminal, and a PNP-type transistor having a base connected to the pull-down resistor, a collector connected to one side of the element, and an emitter connected to the operating voltage.

4. The image forming apparatus according to claim 3, wherein the element is a power light-emitting diode (LED).

5. The image forming apparatus according claim 1, wherein the operating panel part includes a display unit to display the screen for the input of the command from the user, and a switching unit to be turned on or off to supply an operating voltage to the display unit and the operating panel microcomputer,
    wherein the switching unit is turned off by the reset signal, the reset signal being input to the operating panel microcomputer such that the CPU stops the operation of the operating panel microcomputer in the sleep mode.

6. The image forming apparatus according to claim 1, wherein the operating panel part includes a display unit to display a screen to receive a command from the user, a first switching unit turned on or off to supply an operating voltage to the display unit, and a second switching unit turned on or off to supply the operating voltage to the operating panel microcomputer,
wherein the first switching unit and the second switching unit are turned off by the reset signal, the reset signal being input to the operating panel microcomputer such that the CPU stops the operation of the operating panel microcomputer in the sleep mode.

7. An image forming apparatus having an operating panel part to display a screen for input of a command from a user and receives the command from the user, the image forming apparatus comprising:
a central processing unit (CPU) to control an operation of the image forming apparatus;
an operating panel microcomputer provided in the operating panel part, the microcomputer to receive a reset signal from the CPU;
a display unit to display a screen to receive a command from the user; and
a first switching unit to be turned on or off to supply an operating voltage to the display unit and the operating panel microcomputer,
wherein the CPU changes a voltage level of the reset signal, the reset signal being input in the operating panel microcomputer to stop an operation of the operating panel microcomputer in a sleep mode, and
wherein the first switching unit is turned off by the reset signal of the changed voltage level.

8. The image forming apparatus according to claim 7, wherein the operating panel part includes an element to indicate that the image forming apparatus is powered on, and a second switching unit turned on or off to supply an operating voltage to the element,
wherein the second switching unit is turned off by a switching signal, the switching signal being output when the operation of the operating panel microcomputer is stopped.

9. The image forming apparatus according to claim 8, wherein the second switching unit includes a pull-down resistor connected to a ground terminal, and a PNP-type transistor having a base connected to the pull-down resistor, a collector connected to one side of the element, and an emitter connected to the operating voltage.

10. The image forming apparatus according to claim 9, wherein the element is a power light-emitting diode (LED).

11. A power control circuit to control power supply to an operating panel part of an image forming apparatus, the power control circuit comprising:
an input unit to receive an input of various sets of information to execute tasks of the image forming apparatus and to transmit information to an operating panel (OPE) microcomputer of the operating panel part;
a first switching unit to be turned on and off by a switching signal of the OPE microcomputer; and
a power LED to indicate that power of the image forming apparatus is at a power-on state to distinguish between a sleep mode and a power-off mode,
wherein a VCC power is supplied to the power LED when the first switching unit is at a power-on state and the VCC power supply to the power LED is blocked when the first switching unit is at a power-off state.

12. The power control circuit according to claim 11, wherein the first switching unit is turned on when the OPE microcomputer is not operated.

13. The power control circuit according to claim 12, further comprising:
a second switching unit to be turned on when the voltage level of a reset signal received from a main CPU of the image forming apparatus is high and to be turned off when the voltage level of the reset signal is low; and
an LCD to display an operation state of the image forming apparatus, the LCD to be controlled by a control signal of the OPE microcomputer,
wherein when the second switching unit is turned on, the VCC is supplied to the OPE microcomputer, the input unit and the LCD, and
wherein when the second switching unit is turned off, the VCC being supplied to the OPE microcomputer, the input unit and the LCD is blocked.

14. The power control circuit according to claim 11, wherein the OPE microcomputer determines whether the operation mode of the image forming apparatus is a normal mode or a sleep mode according to the information input through the input unit.

15. The power control circuit according to claim 12, further comprising:
a second switching unit to be turned on when the voltage level of a reset signal received from a main CPU of the image forming apparatus is high and to be turned off when the voltage level of the reset signal is low;
a third switching unit to be turned on when the voltage level of a reset signal received from a main CPU of the image forming apparatus is high and to be turned off when the voltage level of the reset signal is low; and
an LCD to display an operation state of the image forming apparatus, the LCD to be controlled by a control signal of the OPE microcomputer,
wherein when the second switching unit is turned on, the VCC is supplied to the LCD and when the second switching unit is turned off, the VCC supplied to the LCD is blocked, and
wherein when the third switching unit is turned on a branching operating voltage branched from the VCC is supplied to the OPE microcomputer and the input unit, and if the third switching unit is turned off, the branching operating voltage branched from the VCC and being supplied to the OPE microcomputer and the input unit is blocked.

* * * * *

UNITED STATES PATENT AND TRADEMARK OFFICE
CERTIFICATE OF CORRECTION

| | | |
|---|---|---|
| PATENT NO. | : 9,069,493 B2 | Page 1 of 1 |
| APPLICATION NO. | : 13/718231 | |
| DATED | : June 30, 2015 | |
| INVENTOR(S) | : Young Hwa Song | |

It is certified that error appears in the above-identified patent and that said Letters Patent is hereby corrected as shown below:

In the claims

Claim 5, Column 10, Line 60

After "according" insert --to--.

Signed and Sealed this
Twenty-seventh Day of October, 2015

Michelle K. Lee
*Director of the United States Patent and Trademark Office*